July 12, 1960  C. W. MOTT  2,944,434
PULLEY
Filed April 8, 1957

INVENTOR.
Earl W. Mott
BY
Atty.

United States Patent Office 2,944,434
Patented July 12, 1960

2,944,434
PULLEY

Carl W. Mott, Lake Ozark, Mo., assignor to Mott Corporation, Brookfield, Ill., a corporation of Illinois Filed Apr. 8, 1957, Ser. No. 651,274

12 Claims. (Cl. 74—230.17)

This invention concerns pulleys with inertia weights creative of centrifugal force to diminish the axial distance between opposed annular flanges for drivingly gripping a belt therebetween, and more particularly relates to improved belt-driving elements respectively having such flanges and unique means for retaining such elements in assembly.

Pulleys of this general character are useful upon the power output shaft of a power source as an internal combustion engine for driving and propelling lawn mowers. When the engine and pulley are at rest the inertia weights are retracted causing axial separation of the pulley flanges and release of the belt so no load is transmitted through the belt while cranking the engine. When the engine attains operating speed the centrifugal force of the weights causes the pulley flanges to grip the belt with sufficient force to transmit the desired amount of power through the belt. Should the load eventually exceed the engine power, causing the engine to decelerate, the centrifugal force will diminish and the consequential diminished gripping of the pulley flanges on the belt will allow it to slip with respect to the pulley to lighten the engine load and prevent stalling. The use of a centrifugal pulley with opposed conical belt-engaging surfaces on the flanges with a V-type belt enables the pulley to expand the belt as it is drivingly gripped, wherefore such pulley also serves as an automatic belt tightener.

An important object of this invention is the provision of a pulley, constructed principally of two complemental belt-driving elements each having a hub, a web and a flange-carrying rim, assembled with the hubs and rims telescopic, while the webs are axially spaced to provide an annular protective enclosure for the inertia weights. It is also contemplated that at least one of the rims or hubs shall be piloted on the rim or hub with which it is in telescopic relation.

Another object of this invention is the provision of a novel arrangement of assembly pins which prevent axial disassembly of the belt-driving elements and which also receive driving force from the centrifugal weights for forcing the flanges into gripping relation with the belt.

These and other desirable objects inherent in and encompassed by the invention are elucidated in the ensuing specification, the appended claims and the annexed drawings, wherein:

Figure 1:
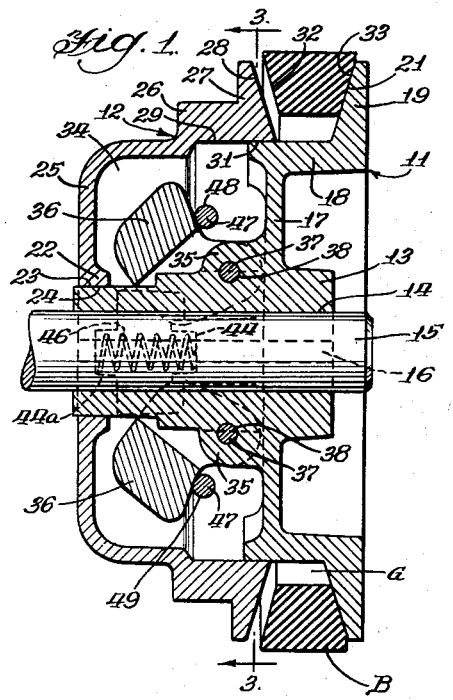
Fig. 1 is an axial sectional view of a preferred embodiment of the invention, illustrating the pulley flanges axially spread to release the belt.

With continued reference to the drawings the pulley can be seen to comprise complemental belt-driving elements 11 and 12. Element 11 has a hub 13 containing a shaft receiving bore 14 in which there is received a drive shaft 15 with which the hub 13 is constrained for rotation by a key 16. A web 17 of the element 11 projects radially therefrom, and at the outer edge of the web 17 is an annular rim 18 upon which there is a belt-gripping flange 19 also annular and projecting radially outward from the rim. This flange 19 has an annular conical belt-engaging surface 21 coaxial with the hub 13 and the shaft 15.

Belt-driving element 11 is regarded as the fixed element inasmuch as it is rotatively and axially fixed with respect to the shaft 15 whereas the belt-driving element 12 is moveable axially relatively to the shaft and to the fixed element 11. Belt-driving element 12 has a hub 22 containing an axial bore 23 constituting a pilot surface receiving and telescopically piloted upon a cylindrical surface 24 of the hub 13. A web 25 of the belt-driving member 12 extends radially outwardly from the hub 22 where it supports an annular rim 26 on which there is an annular flange 27 having an annular conical belt-engaging surface 28 in opposed spaced relation with respect to the conical belt-engaging surface 21 of the belt-driving element 11. Rim 26 has a cylindrical inner periphery 29 piloted upon a cylindrical outer periphery 31 of the rim 18 for axial telescopic movement.

Figure 2:
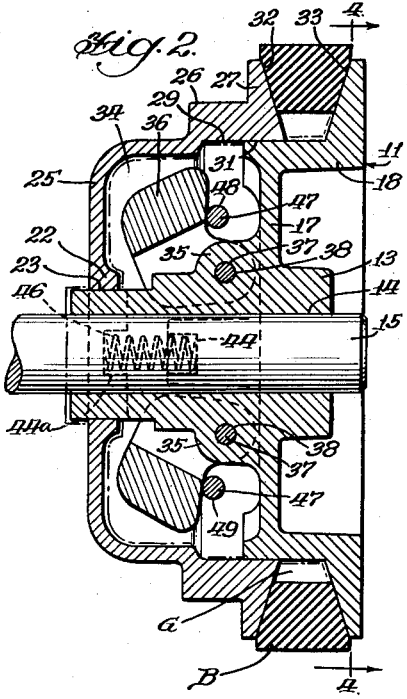
Fig. 2 is a view similar to Fig. 1 but showing the flanges in belt-gripping and belt-tightening relation with the belt.

A belt B is looped 180° about the pulley by being disposed within the groove G formed between the flanges 19 and 27. In Fig. 1 the belt-driving element 12 is shown axially retracted leftward with respect to the element 11 for loosening the belt which has a keystone cross-section and thereby establishes a condition of no-drive between the pulley and the belt. In Fig. 2 the belt-driving element 12 is axially advanced rightward with respect to the element 11 whereby the belt engaging surfaces 21 and 28 are forced into gripping relation with the converging sides 32 and 33 of the belt B. This gripping action of the belt-engaging surfaces 21 and 28 upon the belt expands it radially of the pulley to tighten the belt between this pulley and a complemental pulley (not shown) upon which the other end of the belt is conventionally looped.

The axially spaced-apart webs 17 and 25 of the belt-driving elements 11 and 12 together with the hubs 13 and 22 and the rims 18 and 26 enclose an annular inertia-weight-receiving chamber 34.

Figure 4:
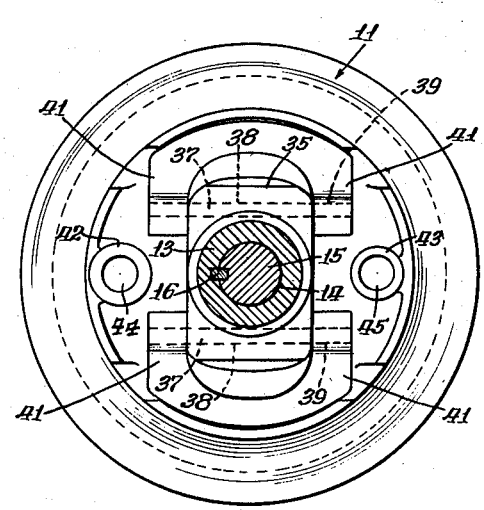
Fig. 4 is a view taken at the line 4—4 in Fig. 2, of the inner end face of the axially fixed belt-driving element, together with the inertia weights mounted thereon.

In Figs. 1, 2 and 4 the hub 13 can be seen to have diametrically opposite bosses 35 upon which inertia weights 36 are respectively mounted by means of pivot pins 37 which are mounted in bores 38 in the bosses 35 and extending into bearing bores 39 in furcations 41 of the weights that straddle the bosses 35. Weights 36 are assembled with the bosses 35 by means of the pins 37 before the moveable belt-driving element 12 is assembled with the element 11.

Figure 3:
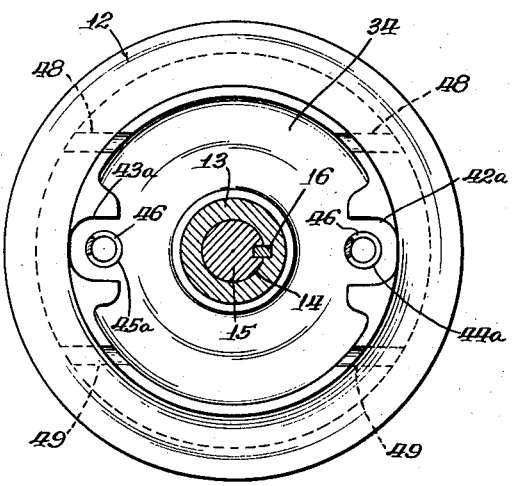
Fig. 3 is a view taken at the line 3—3 in Fig. 1 of the inner end face of the axially movable belt-driving element of the pulley.

In Fig. 4 diametrically opposite spring receiving bosses 42 and 43 are visible as well as spring receiving seats 44 and 45 in these bosses. Belt-driving element 12 in its web 25 has diametrically opposite notches 42a and 43a for respectively receiving the bosses 42 and 43 when the parts 11 and 12 are axially assembled. In Figs. 3 and 4 it can be seen the boss 42 exceeds the boss 43 in diameter and that the span of the notch 42a exceeds the span of the notch 43a so the elements 11 and 12 can be assembled only with the bosses 42 and 43 respectively in the notches 42a and 43a. Helical compression springs 46 are disposed in the recesses 44a and 45a before axially assembling the pulley elements 11 and 12, it being ascertainable in Fig. 3 the diameters of the recesses or spring seats 44a and 45a are substantially the same as the outside diameter of the springs so the springs insert firmly in these seats. On the other hand the recesses or seats 44 and 45 are slightly oversized in diameter with respect to the springs so the right ends of these springs as observed in Figs. 1 and 2 can be more readily piloted into the recesses 44 and 45 attendant to assembly of the pulley elements 11 and 12.

Axial assembly of the pulley elements 11 and 12 is accomplished attendant to inserting the free or right ends of the springs as observed in Figs. 1 and 2 into the spring seats 44 and 45 of the element 11 and the springs are compressed between the elements as the bosses 42 and 43 are projected into the notches 42a and 43a and as the hub piloting surfaces 23 and 24 and the rim piloting surfaces 29 and 31 are placed in axial telescopic relation. After such telescopic associations of the pulley elements 11 and 12, assembly retaining pins 47 are inserted respectively through upper bores 48 extending chordally through the rim 26 and likewise through coaxial bores 49 at the lower part of the element 12 as shown in the drawings. These retaining pins 47 are disposed between the centrifugal weights 36 and the web 17 of the pulley element 11. These pins 47 are abuttable by the centrifugal weights 36 irrespective of whether the pulley elements 11 and 12 are axially expanded as illustrated in Fig. 1 or axially contracted as illustrated in Fig. 2 to prevent accidental disassembly of the elements 11 and 12. It will be noted, from an inspection of Figs. 1 and 2, that the right-hand faces of the weights 36 slant outwardly and to the left, as viewed in these figures. These faces thus constitute plane cam surfaces oblique to a radius, which bear axially against the pins 47 and thus move elements 11 and 12 toward each other as the weights move radially.

During rotation of the pulley the weights 36 revolve about the principal common axis of the shaft 15 and the hubs 13 and 22 to develop centrifugal force which is of a magnitude constituting a direct function of pulley speed. The pivot pins 37 and the assembly retaining pins 47 serve as weight reaction elements to which this centrifugal force of the weights is applied for moving the belt-driving elements axially toward one another in opposition to the yieldably urging means in the form of the springs 46 for pressing the belt-engaging surfaces 21 and 28 in gripping relation with the sides of the belt with a force constituting a direct function of the pulley rotational speed.

Having described a single preferred embodiment of the invention with the view of clearly and concisely illustrating the same, I claim:

1. A belt-driving pulley comprising complemental belt-driving elements each including a hub, a web extending radially outward from the hub, an axially extending pilot rim on a radially outward portion of the web, and a flange projecting radially outward from the rim to dispose a conical belt-engaging surface of such flange coaxially with the hub, the hubs of such elements and the rims thereof being axially telescopically disposed and at least one of such hubs and rims being piloted on the one telescopically disposed therewith, the webs of such elements being spaced apart axially of the hubs and rims wherefore the hubs, webs and rims form an annular weight-receiving chamber, means yieldably urging the elements axially apart to increase the axial spacing between the belt-engaging surfaces, weight reaction elements in said chamber and respectively on the belt-driving elements, centrifugal weight means disposed in said chamber for revolving about the axis of the hubs to develop centrifugal force attendant to rotation of the belt-driving elements, and the centrifugal weight means being operable to apply components of the centrifugal force to the weight reaction elements for moving the belt-driving elements relatively axially toward one another in opposition to the yieldably urging means and pressing the belt-engaging surfaces in gripping relation with a belt therebetween with a force constituting a direct function of the pulley rotational speed.

2. A belt-driving pulley comprising complemental belt-driving elements each including a hub, a web extending radially outward from the hub, an axially extending pilot rim on a radially outward portion of the web, and a flange projecting radially outward from the rim to dispose a conical belt-engaging surface of such flange coaxially with the hub, the hubs of such elements and the rims thereof being axially telescopically disposed and at least one of such hubs and rims being piloted on the one telescopically disposed therewith, the webs of such elements being spaced apart axially of the hubs and rims wherefore the hubs, webs and rims form an annular weight-receiving chamber, means yieldably urging the elements axially apart to increase the axial spacing between the belt-engaging surfaces, weight guide means on the hub of one of the elements, force-receiving means in said chamber and on the other of said elements, inertia weights in the chamber and directed by said guide means to apply centrifugal force developed thereby attendant to rotation of the pulley against the force receiving means in an axial direction to force the flange of such other element toward the flange of the one element.

3. A belt-driving pulley comprising complemental belt-driving elements each including a hub, a web extending radially outward from the hub, an axially extending pilot rim on a radially outward portion of the web, and a flange projecting radially outward from the rim to dispose a conical belt-engaging surface of such flange coaxially with the hub, the hubs of such elements and the rims thereof being axially telescopically disposed and at least one of such hubs and rims being piloted on the one telescopically disposed therewith, the webs of such elements being spaced apart axially of the hubs and rims wherefore the hubs, webs and rims form an annular weight-receiving chamber, means yieldably urging the elements axially apart to increase the axial spacing between the belt-engaging surfaces, pivot means in the chamber on the hub of one of the elements, inertia weights in the chamber in axially spaced relation from the web of such one element and pivotally mounted on said pivot means to swing radially outward and toward the web of the one element under the action of centrifugal force attendant to rotation of the pulley, and force-receiving means engageable by said weights and carried in said chamber by the other element and extending between the weights and the web of the one element to prevent separation of said elements, and the weights being operable to apply the centrifugal force to said force-receiving means to axially contract the elements to diminish the distance between the belt-engaging surfaces.

4. The combination set forth in claim 3, wherein said force receiving means is in the form of pulley assembly maintaining pins mounted in the rim of said other element and projecting chordally into the chamber between the weights and the web of the one element.

5. A belt-driving pulley comprising complemental belt-driving elements each including a hub, a web extending radially outward from the hub, an axially extending pilot rim on a radially outward portion of the web, and a flange projecting radially outward from the rim to dispose a conical belt-engaging surface of such flange coaxially with the hub, the rim of one of such elements having a radially outer periphery extending in parallelism with the axis of the hub of such element, the rim of the other element having an inner periphery telescopically piloted on said outer periphery, the hubs of said elements being telescopically disposed, the webs of said elements being spaced apart axially wherefore the webs, hubs and rims form an annular weight-receiving chamber, means yieldably urging the elements axially apart to increase the axial spacing between the belt-engaging surfaces, pivot means in the chamber on the hub of the one element, inertia weights in the chamber in axially spaced relation from the web of the one element and pivotally mounted on said pivot means to swing radially outward and toward the web of the one element under the action of centrifugal force attendant to rotation of the pulley, pulley assembling pins mounted in the rim of the other element and projecting chordally through the chamber between the weights and the web of the one element, and the weights being operable to apply the centrifugal force to said pins to axially contract the elements to diminish the distance between the belt-engaging surfaces.

6. A belt-driving pulley comprising complemental belt-driving elements each including a hub, a web extending radially outward from the hub, an axially extending pilot rim on a radially outward portion of the web, and a flange projecting radially outward from the rim to dispose a conical belt-engaging surface of such flange coaxially with the hub, the hubs of such elements and the rims thereof being axially telescopically disposed and at least one of such hubs and rims being piloted on the one telescopically disposed therewith, the webs of such elements being spaced apart axially of the hubs and rims wherefore the hubs, webs and rims form an annular weight-receiving chamber, the web of one of said elements having bosses axially projecting into said chamber, the web of the other element having notches respectively receivable of said bosses when said elements are axially assembled and to interlock with said bosses to preclude relative rotation of said elements, spring seat recesses respectively in said bosses, additional spring seat recesses respectively embraced by said notches and respectively coaxial with the boss recesses, and helical compression springs having one end respectively in the boss recesses and their opposite ends respectively in the notch-embraced recesses to yieldably urge the belt-driving elements relatively axially apart, and speed responsive means in said chamber operable in response to rotative speed of the pulley to dominate the force of said springs and axially contract said elements to diminish the spacing of the belt-engaging surfaces.

7. The combination set forth in claim 6, wherein certain of the spring seat recesses are of a diameter to firmly hold the ends of the springs inserted thereinto, and wherein the seat recesses coaxial with such certain recesses are of larger diameter than the opposite ends of the springs to facilitate the projection of such ends thereinto attendant to axial assembly of the elements.

8. A belt driven pulley comprising a pair of members respectively having conical surfaces which together form a belt receiving groove, said members being relatively movable axially thereof to vary the width of said groove, a shaft supporting said members, one of said members having abutments thereon comprising cross pins mounted in said one member, said cross pins being located between said weights and a radially extending portion of said other member thereby retaining said members in assembled relation, centrifugal weights mounted on the other of said members for rotation therewith and radially movable on rotation of said members, said weights having plane cam surfaces oblique to a radius and axially engaging said abutments for drawing said members toward each other to reduce the width of said groove as said weights move radially in response to rotation of said members.

9. A belt driven pulley according to claim 8, having spring means interposed between said members and tending to move said members away from each other.

10. A belt driven pulley according to claim 8, in which each of said members has a web and a flange, the flanges of said members respectively providing said conical surfaces, and the webs of said members forming a chamber in which said weights are located.

11. A belt driven pulley comprising a pair of members respectively having conical surfaces which together form a belt receiving groove, said members being relatively movable axially thereof to vary the width of said groove, a shaft supporting said members, one of said members having a pair of notches eccentrically located therein and the other of said members having a pair of bosses engageable in said notches to secure said members together for rotation with each other, one of said members having abutments thereon and the other of said members having centrifugal weights mounted thereon for rotation therewith and radially movable on rotation of said members, said weights having plane cam surfaces oblique to a radius and axially engaging said abutments for drawing said members toward each other to reduce the width of said groove as said weights move radially in response to rotation of said members.

12. A belt driven pulley according to claim 11, in which a pair of springs are mounted in the respective bosses and notches and tend to move said members away from each other.

References Cited in the file of this patent

UNITED STATES PATENTS

| | | |
|---|---|---|
| 2,317,339 | Steven | Apr. 20, 1943 |
| 2,496,061 | Miner | Jan. 31, 1950 |
| 2,534,409 | Bray | Dec. 19, 1950 |
| 2,622,446 | Shaw | Dec. 23, 1952 |
| 2,678,566 | Oehrli | May 18, 1954 |

FOREIGN PATENTS

| | | |
|---|---|---|
| 18,637 | Great Britain | of 1909 |
| 435,257 | Great Britain | Sept. 18, 1935 |